(No Model.)
H. A. DANIELS & A. G. DICKINSON.
PAVEMENT.
No. 346,735. Patented Aug. 3, 1886.
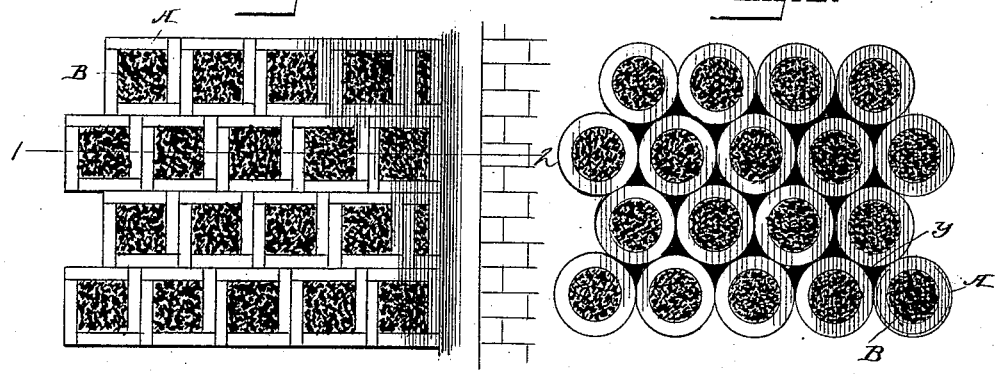

UNITED STATES PATENT OFFICE.

HENRY A. DANIELS, OF YONKERS, AND ANDREW G. DICKINSON, OF NEW YORK, N. Y.

PAVEMENT.

SPECIFICATION forming part of Letters Patent No. 346,735, dated August 3, 1886.

Application filed January 15, 1886. Serial No. 188,679. (No model.)

*To all whom it may concern:*

Be it known that we, HENRY A. DANIELS and ANDREW G. DICKINSON, citizens of the United States, and respectively residing at Yonkers, in the county of Westchester and State of New York, and New York, in the county and State of New York, have invented certain new and useful Improvements in Pavements, of which the following is a specification.

Our invention is an improved pavement having a surface consisting of separated blocks of artificial stone with intervening portions of wood, and formed of separate blocks or pieces each consisting of a shell of wood or its equivalent filled with artificial-stone composition, and all arranged side by side upon a suitable foundation.

In the drawings, Figure 1 is a plan view illustrating our improved pavement. Fig. 2 is a sectional elevation on the line 1 2, Fig. 1. Fig. 3 is a sectional elevation of one of the blocks, illustrating a modification. Fig. 4 is a plan view of our pavement as made from cylindrical blocks. Fig. 5 is a sectional elevation illustrating the manufacture of the blocks.

In the manufacture of our improved pavement or flooring we use a series of shells of wood or equivalent material or composition, each of which is filled with an artificial stone of any suitable character, the shells then being arranged side by side in the same manner as ordinary paving-blocks upon any suitable foundation. The shells A may be of any suitable form. In Fig. 1 they are shown as consisting of wood made into rectangular boxes open at the top, and in some instances closed at the bottom, as shown in Fig. 2, although they may be mere tubes open at both ends, as shown in Fig. 3. In Fig. 4 the shells are shown as consisting of hollow cylinders of wood, which may be closed at the bottom, or mere tubes. Whatever is the shape of the shell it is filled with a composition forming an artificial-stone core, B, which composition is introduced in a plastic state and solidifies and hardens with the shell.

Ordinarily such compositions contain soluble glass or solutions of vitriol, alum, &c., which solutions as the compositions dry are absorbed by the wood, and the latter is thereby hardened and impregnated with the salts in solution and rendered much more durable and less likely to be affected by moisture than mere unprepared wood.

We have found it better to consolidate the composition in the shells by pressure. This we prefer to effect by inserting each shell in the socket $x$ in the bed D of a press, which socket corresponds to the shape of the shell, and the plunger E of the press is then brought down upon the mass of composition within the shell with sufficient force to consolidate the same to the extent desired.

In building the pavement or floor the blocks, consisting of the filled shells, are arranged side by side upon the foundation X, prepared in any suitable manner; in the same manner as ordinary paving-blocks, and when the blocks are of such form—as, for instance, when cylindrical blocks are used—as to leave spaces $y$ between them, as shown in Fig. 4, these spaces are filled with cement, artificial-stone composition, asphalt, or other suitable filling material.

A pavement constructed as above described has many advantages over one consisting wholly of blocks of artificial stone or of wood. As before stated, the wood is impregnated and preserved by the absorption of the solutions from the stone composition, while the edges of the stone portions are protected and guarded by the surrounding wood portion, thereby preventing the splitting away of the blocks, which would otherwise be apt to result. The surface also affords a much better hold for the feet of the horses than one wholly of stone, while it is much more durable and less apt to wear in ruts and chip away than one consisting entirely of wood. Moreover, it is well known that it is practicable to make much better artificial stones in small blocks than when the material is extended over large surfaces, and a pavement, therefore, consisting of small shells filled with artificial-stone composition will present a much harder stone-surface than could be secured with the same compositions extending over the entire surface.

Although we have described the said blocks as being employed for pavements, they may be used for indoor purposes in warehouses, fireproof buildings, &c., and although we have referred to the shells as consisting of wood, they may be made of materials or compositions of analogous substances—as, for instance, of compressed paper-pulp.

In some instances we prefer to perforate the sides of the shells so that portions of the composition will extend into the perforations, thereby fastening the artificial blocks firmly in the shells, and in some instances the empty shells may be placed side by side upon the foundation X, and then filled with the artificial composition while it is in a pasty state, in which case it will extend through the perforations from one shell to the other and tie the whole firmly together.

Without limiting ourselves to the precise construction and arrangement of parts shown, we claim—

1. A block for pavements and other purposes, consisting of a shell of wood or its equivalent, inclosing a block of artificial stone, substantially as set forth.

2. A pavement or flooring consisting of a series of wooden shells each filled with an artificial-stone composition and arranged side by side upon a suitable foundation, substantially as set forth.

3. The combination, in a pavement or flooring, of a foundation, a series of shells of wood or its equivalent, arranged side by side upon said foundation, open at the top and filled with artificial-stone composition, substantially as set forth.

4. A pavement having a surface consisting of separated blocks of artificial stone with intervening portions of wood, substantially as described.

5. A block for pavements consisting of a shell having perforated sides and filled with an artificial-stone composition extending through the perforations in the sides, substantially as set forth.

6. The combination, in a pavement, of a series of shells arranged side by side upon a foundation, each perforated at the side, open at the top, and filled with an artificial-stone composition, substantially as set forth.

In testimony whereof we have signed our names to this specification in the presence of two subscribing witnesses.

HENRY A. DANIELS.
ANDREW G. DICKINSON.

Witnesses:
HARRY M. DICKINSON,
H. P. STAMFORD.